Patented Aug. 25, 1931

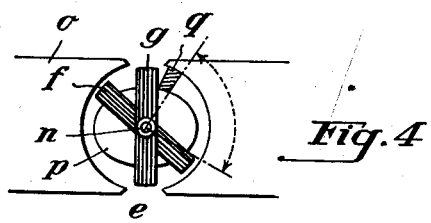
Fig. 4
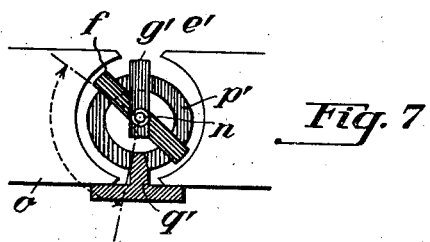
Fig. 7
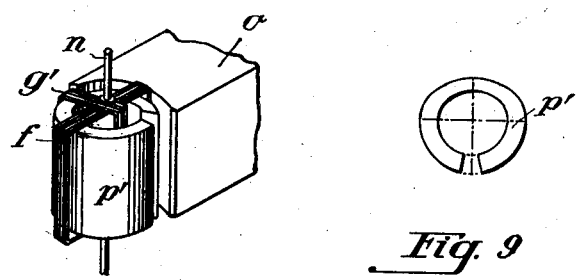
Fig. 8
Fig. 9

1,820,738

UNITED STATES PATENT OFFICE

HEINZ GRÜSS, OF BERLIN-STAAKEN, AND KURT RAU, OF BERLIN-CHARLOTTENBURG, GERMANY, ASSIGNORS TO SIEMENS & HALSKE, AKTIENGESELLSCHAFT, OF SIEMENSSTADT, NEAR BERLIN, A GERMAN CORPORATION

ARRANGEMENT FOR THE DETERMINATION OF RESISTANCES

Application filed March 30, 1928, Serial No. 265,908, and in Germany April 9, 1927.

As is well known, for the testing of electric resistances there can be used either a Wheatstone bridge connection or a cross coil instrument. The first mentioned well known method has the drawback that the resulting measurement is affected by fluctuations of the working voltage if it is desired to avoid working on the zero principle. It is true that this drawback is eliminated when working with a cross coil instrument, but on the other hand in such a case, more particularly when measuring very small changes of resistances, considerable difficulties are met with in practice. The torque of the cross coil instrument is proportional, as is well known, to the difference in the numbers of ampere turns of the two cross coils. If this difference fluctuates only between 0—1%, as will be the case when measuring changes of resistance, it would be necessary in the first place to use very high numbers of ampere turns in order to obtain a sufficient torque and, moreover, an angle of crossing for the coils which is close to 180°. These two conditions act however in a very unfavourable manner on each other. The great strength of current in the cross coil instrument results in a strong heating of the rotating coils and their leads. It is therefore necessary to make the coil system very compact, owing to which the friction is of course increased. Moreover the lead bands must be made so thick that an inadmissible torque produced by them cannot be altogether avoided. Further, owing to the strong heating of the coils, a warping of their turns is easily liable to take place, which with the necessary angle of crossing of nearly 180°, implies great changes of sensitiveness. For these reasons the measurement, more particularly of small changes of resistance, by means of a cross coil instrument, with the use of the well known connection in which the resistance to be tested is placed in the circuit of one coil of the cross coil instrument, and a standard comparing resistance in the circuit of the other coil, can be applied in practice only to a limited extent if at all.

According to the invention, the use of a cross coil instrument without forfeiting its advantage, namely the fact that the measurement is not affected by fluctuations of the working voltage, and with elimination of the drawbacks of the well known connections, is rendered possible by switching one of the two cross coils into one diagonal branch of a bridge connection containing the resistance to be tested whilst the second coil of the cross coil instrument is connected to the working voltage or to a voltage proportional to it. The new arrangement makes it possible to ascertain with great exactitude small changes of resistance by means of cross coil instruments of standard construction, as in such a case the bridge current is constituted in fact by the difference of the currents in the two branches to be compared.

In the drawings several embodiments of the invention are represented by way of example.

Fig. 4 shows in plan the indicating instrument of Fig. 2,

Fig. 7 is a plan view and Fig. 8 a perspective view of the indicating instrument in the arrangement of Figs. 5 and 6, Fig. 9 is a section through the core of the instrument shown in Figs. 7 and 8.

Figure 1:
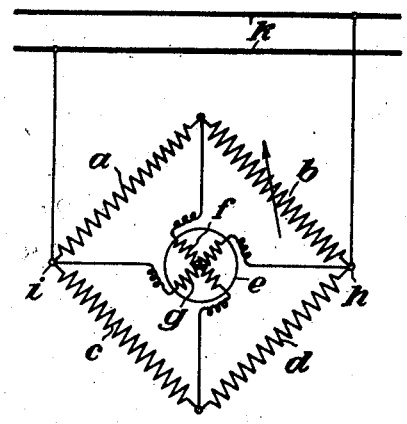
Fig. 1 illustrates the principle of the invention.

In Fig. 1 the resistance $a$ to be tested is connected with three other resistances $b, c, d$ to a bridge connection in which into one diagonal branch is switched one coil $f$ of a cross coil instrument $e$. The other coil $g$ of the instrument is connected to the working voltage obtained from the conductors $k$, by connection to the points $i$ and $h$. If necessary, between the coil $g$ and the points $i$ and $h$ there could be further inserted auxiliary resistances which can be used for adjusting the sensitiveness, and reduce or compensate the temperature coefficient.

When testing the variable relation of two resistances, for instance of the resistances $a$ and $b$, it is particularly advisable to set the cross coil instrument in such a manner that for a given normal value of the said relation, the cross coil influenced by the working voltage, shall absorb the greatest magnetic flux.

The new arrangement is not limited to direct measurement of resistances. It can also be applied in cases in which any other values are measured by the said resistance. For instance the two resistances $a$ and $b$ in the drawings, could belong to two different resistance thermometers. The cross coil instrument $e$ would then measure any difference between the temperatures to which the two resistances are exposed. In a corresponding manner, the new arrangement could be used for instance also for electric flue gas testers in which then at least the resistance $a$ is played upon by the flue gases, and the resistance $b$ by a standard (comparing) gas.

The measuring instrument described is suitable for direct as well as for alternating current, so that it can be used for determining not only the change of "real" (ohmic) resistances, but also of "complex" resistances (capacities, inductances).

In some cases a compensation of the temperature coefficient as described with respect to Fig. 1 is insufficient. This applies more particularly to the case of electric flue gas testers which work on the principle of measurement of the heat conductivity.

It has been found that in every case a sufficient compensation can be made by connecting a resistance in series with the directing moment coil of the cross coil instrument whilst a second resistance of a different temperature coefficient from the first, is connected in parallel. Such an "artificial" connection can be repeated several times if necessary.

Figure 2:
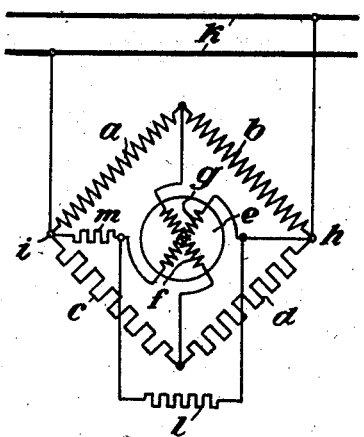
Fig. 2 is a first embodiment of the invention.
Figure 3:
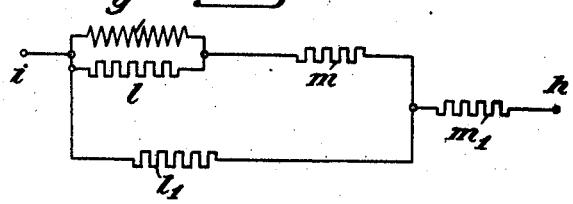
Fig. 3 is another form of the temperature compensation in the arrangement of Fig. 2.

Two constructions are illustrated by way of example in Figures 2 and 3.

In Figure 2 the resistances $a$, $b$, $c$, $d$ are arranged as a Wheatstone bridge which is fed from the mains $k$. In the diagonal branch of the said bridge is arranged a coil $f$ of a cross coil instrument $e$, the directing moment coil $g$ of which is connected at $i$ and $h$ to the working voltage. In series with the directing moment coil $g$ is connected a resistance $m$ and in parallel to the coil, a resistance $l$ of a different temperature coefficient. The resistance $m$ could be made for instance of nickel or copper, whilst for the resistance $l$ there is used manganin, constantan or some other resistance material which remains practically constant. In such a case, as the temperature coefficient of the directing moment current for the directing moment coil $g$ and the maximum auxiliary resistance $m$ there will be obtained the temperature coefficient of the material of which the resistance $m$ is made.

Owing to the resistance $l$ of a material practically unaffected by temperature variations, being arranged parallel to the directing moment coil $g$, the compensation can be substantially improved by making the resistance $m$ as great as possible relatively to the parallel connection $g$, $l$, which can be always attained as the mass energy in the coil $g$ can be relatively small. Calculation shows that in such a case it is possible to obtain with the directing moment coil a coefficient which is approximately twice as great as the temperature coefficient of pure metals, for instance nickel, copper or iron.

If desired, the value of the coefficient available for the compensation can be multiplied still further, for instance to three times the normal coefficient of the material unaffected by temperature variations which has been utilized.

This case plays a particularly important part in flue gas testers which work on the principle of measurement of the heat conductivity. In some cases, the compensation connection shown in Figure 2 will not be completely sufficient for the purpose. It must be taken into account that in addition to the pure electrical temperature coefficient which is given by the unintentional change of the resistance of the bridge connection, there is also a further temperature coefficient which is determined by the temperature dependence on the difference of the heat conductivity of the gas, for instance, carbonic acid, the proportion of which is to be determined, and of the standard or comparison gas, preferably air. In this case or when using the arrangement for flue gas testing at least two resistances of the bridge, for instance, the resistances $c$ and $d$ must be made of a material sensitive to temperature. This is indicated in Fig. 2, by representing the resistances $c$ and $d$ in a special manner. Both temperature coefficients "work themselves out" in such a manner that they produce an increase in the temperature fault, unless a strengthened compensation is used at the same time for the directing moment coil. In order amply to comply with this condition there can be used the connection for the directing moment coil $g$ of the cross coil instrument $e$, shown in Figure 3.

Parallel to the directing moment coil $g$ is again connected a resistance $l$ of a material practically insensitive to temperature, and in series with the said coil a resistance $m$ with a high temperature coefficient. In parallel to this connection is then connected a further resistance $l_1$ of manganin or the like, and in series, another resistance $m_1$ of a material strongly affected by changes in temperature. The whole arrangement is connected at $i$ and $h$ to the working voltage or to a voltage depending on the latter in accordance with a given law.

In the examples discussed in the foregoing, the temperature coefficient of the current in the directing moment coil $g$ has been always assumed as negative, that is to say at higher temperatures there was a smaller current than at lower temperatures. For that reason, a directing moment current with a negative temperature coefficient was also provided. Cases however frequently occur in which directing moment currents with positive temperature coefficients must be used in the artificial connection. By way of example may be mentioned the measurement of the methane contents of the air by the method of measurement of the heat conductivity by means of an electric bridge connection. Owing to the high temperature coefficient of the heat conductivity of the methane, the arrangement mentioned has a positive temperature coefficient. In this case the resistance connected in series in the arrangement according to Figures 2 and 3 must be made either of a material unaffected by changes in temperature or of a material with a negative temperature coefficient, whilst the parallel resistance must have a high positive temperature coefficient.

A suitable form of the indicating instrument in the arrangements of Figs. 2 and 3 is shown in Fig. 4.

In Figure 4 the two cross coils $f$ and $g$ of the instrument $e$ are rotatably mounted about the spindle $n$ at angle of say 50° to each other, in the field of a magnet $o$. The angle between the two coils should preferably be between 40 and 60°. The core $p$ of the cross coils $f$ and $g$ is assumed to be fixed, and its support or holder $q$ is mounted unsymmetrically at one end of one pole shoe. The pole shoes of the magnet $o$ are recessed or bored out to circular shape, whilst the core $p$ has an elliptical cross section. The object of this construction is to obtain a particularly well defined zero position. As will be seen from the drawing, with such an instrument, the core support $q$ will form a stop for the coils $f$ and $g$ and the angular movement of the cross coil system will have the extent indicated by the dotted arc and radial lines.

The invention is also applicable for such cases in which the cross coil instrument should be installed at any desired points at a distance from the bridge connection, without the indications of the instrument being unfavourably affected. Consequently, in the new arrangement no subsequent calibration is required when the place of the cross coil instrument is changed.

This is done by calculating the resistance of the current branch in which is situated the directing moment coil of the cross coil instrument, with reference to the bridge resistances and to the resistance in the diagonal branch, in such a manner that the resistance of the leads for the two cross coils is compensated with reference to the indication of the cross coil instrument.

In the case of equal bridge resistances for instance, this condition is fulfilled when the resistance in the current branch of the directing moment coil is equal to the sum of the resistance values of the current branch of the galvanometer coil of the cross coil instrument, and of one bridge resistance. In the case of unequal bridge resistances, a formally somewhat complicated mathematical expression is obtained which however can also be easily complied with in practice. It is advisable to make the change of the variable bridge branch resistance or resistances as small as possible relatively to the resistance amounts of the individual bridge resistances, for instance by means of auxiliary resistances. A good temperature compensation can also be obtained in a simple manner in the new arrangement.

Figure 5:
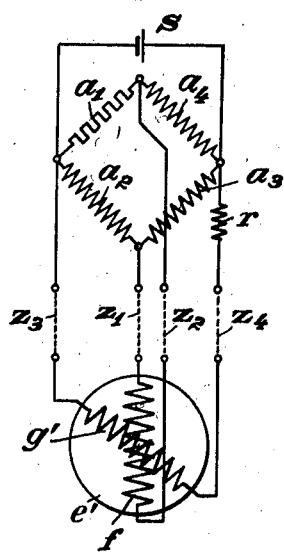
Figs. 5 and 6 are a second and a third embodiment of the invention.
Figure 6:
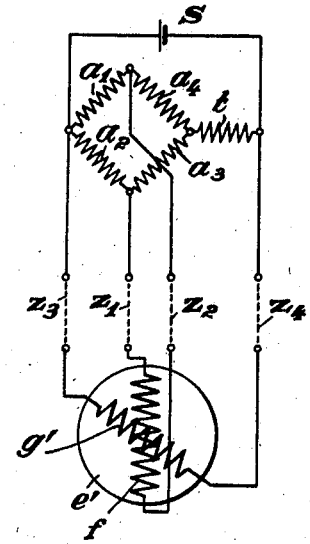

Two constructions of this form of the invention are shown in Figures 5 and 6. In both Figures, with four resistances $a_1$ to $a_4$, of which $a_1$ is assumed to be variable in response to temperature changes, are formed bridge connections, into the diagonal branch of which is switched by means of the leads $z_1$ and $z_2$ the galvanometer coil $f$ of a cross coil instrument $e'$ installed at any desired, if necessary, variable distance. If desired a plurality of resistances, for instance $a_1$ and $a_2$, could be variable, for instance in the case of flue gas testers. The directing moment coil $g'$ is connected by means of the leads $z_3$ and $z_4$ to the working voltage. In Figure 5 an auxiliary resistance $r$ is provided for the coil $g'$, whilst in Figure 6 it is assumed that the required resistance has been arranged in the coil $g'$. Both cases can be used at will.

According to Figure 5, the voltage connected to the directing moment branch, is always proportional to the voltage of the source of current $s$, connected to the bridge, independently of any changes of the bridge resistance or resistances. According to Figure 6, a current of practically constant strength flows in the bridge even when the resistances change. To that end, in front of a source of current $s$ is inserted a very high auxiliary resistance $t$.

The application of the invention will be now explained for the two extreme cases which are illustrated in the figures.

If the resistance values of the resistances $a_2$ to $a_4$ in Fig. 5 are designated by $w_2$ to $w_4$, the resistance value of $a_1$ by $w_1 + \triangle w$, the resistance of the directing moment coil $g'$ by $w'_g$, that of the galvanometer coil $f$ by $w'_f$, the sum of the resistances of the leads $z_1$ and $z_2$ by $w_z$, and if the sum of the resistances of the leads $z_3$ and $z_4$ is also made $w_z$, for instance by using a cable, then for the resistances $w_g$ and $w_f$ of the current branches of the directing moment and galvanometer coils, will be obtained, by neglecting the resistance $r$:

$$w_g = w'_g + w_z \text{ and } w_f = w'_f + w_z$$

When the resistance amount $w_1$ changes to the extent of $\triangle w$, the following equation will apply for the current in the diagonal branch: $z_1$, $f$, $z_2$.

$$i_f = \frac{E \cdot w_3 \cdot \triangle w}{w_f \cdot (w_1+w_4)(w_2+w_3) + w_1 \cdot w_4(w_2+w_3) + w_2 w_3(w_1 w_4)},$$

in which E is the working voltage.

The current in the current branch of the directing moment coil is $$i_g = \frac{E}{w_g}.$$

By dividing the two expressions will be obtained.

$$\frac{i_f}{i_g} = \frac{\dfrac{w_g \cdot w_3 \cdot \triangle w}{(w_1+w_4)(w_2+w_3)}}{w_f + \dfrac{w_1 \cdot w_4(w_2+w_3) + w_2 w_3(w_1+w_4)}{(w_1+w_4)(w_2+w_3)}}$$

If the expression $$\frac{(w_1+w_4)(w_2+w_3)}{w_3 \cdot \triangle w} = C$$

is inserted here, and the above mentioned expressions for $w_g$ and $w_f$ are introduced, there will be obtained:

$$C \cdot \frac{i_f}{i_g} = \frac{w'_g + w_z}{w'_f + w_z + \dfrac{w_1 \cdot w_4(w_2+w_3) + w_2 w_3(w_1+w_4)}{(w_1+w_4)(w_2+w_3)}}$$

In order to make this ratio, and therefore the indication of the cross coil instrument, independent of the resistance $2w_z$ of the leads $z_1$ to $z_4$, the following conditions must be fulfilled $w'_g = w'_f + A$, in which A is the quotient in the denominator of the preceding equation, for only the fraction $$\frac{u + w_z}{u + w_z}$$

is constant, namely equal to one, independently of the value of $w^z$. It becomes simplified for the case $w_1 = w_2 = w_3 = w_4 = w$ and for $\triangle w$ very small relatively to $w$, and becomes: $w'_g = w'_f + w$.

It is immaterial here whether the resistance $w'_g$ is the actual resistance of the directing coil, or whether it is constituted by the resistance of said coil plus an auxiliary resistance $r$. The equation is valid for any deflection only when $\triangle w$ is of a very small value relatively to $w_1$, as the expression A depends on $\triangle w$. The influence of the change of $\triangle w$ is however very slight, so that for instance for $\triangle w = 16$ ohms, with one bridge branch $w_1 = 100$ ohms, there will be produced an error of only 2% of the measured value if the bridge is calibrated in the unsymmetrical position $\triangle w = 16$ ohms, and $\triangle w$ is reduced to half. This error will be made when the resistance of the leads varies from zero to the infinite. In the case of normal lead resistances of about 1000 ohm, there will be obtained, near zero ohms, resistance of leads, an error of about 1%, so that for all the cases occuring, it is necessary to reckon with a maximum error of the leads of $\pm 0,5\%$.

The calculation can be carried out in a corresponding manner for the case shown in Figure 6. In this case, for the condition required in order that the resistance of the leads should not affect the indication of the cross coil instrument, will be obtained the expression $$w'_g = w'_f + \frac{(w_1+w_2)(w_3+w_4)}{w_1+w_2+w_3+w_4}$$

For the case in which there are four equal bridge resistances, there will be obtained again: $w'_g = w'_f + w$. For the rest, in the case of Figure 6 also the same considerations apply as mentioned with reference to Figure 5. By way of a numerical example it may be mentioned that the foregoing general equation gives for $$w_1 = 101 \text{ and } w_2 = w_3 = w_4 = 100 \text{ ohms},$$

the following $w'_g = w'_f + 100.25$.

Practically the same value for $w'_g$ will be obtained also from the equation derived with reference to Figure 5. It follows from this that the conditions stated will always apply in practice, without regard to the fact in which way the connection of the bridge connection to the source of current is effected, or of which kind it is.

In order to compensate in the new arrangement an undesired influence of temperature, the proceeding is preferably as follows: the two cross coils are made of the same resistance amount and from materials which have the same temperature coefficient, that is to say for instance both of the same material. Moreover, an auxiliary resistance for the directing moment coil is calculated, as regards its magnitude and temperature coefficient, in such a manner as to compensate the influence which any changes of resistances of the leads, due to temperature differences, exert on the indication. This condition is fulfilled when, with equal bridge resistances, the two values for the auxiliary resistance are equal to the corresponding values of one bridge resistance or when, in the case of unequal bridge resistances, the above general expressions show these values. As a rule it will be sufficient if the changes of one cross coil, due to the temperature, are equal to those of the other coil.

It is advisable to use in the arrangement of Figs. 5 and 6 the special indicating instrument represented in Figs. 7, 8 and 9. This construction of the indicating instrument is based on the following considerations:

The galvanometer coil $f$ of the cross coil instrument $e$ in Figs. 5 and 6 preferably moves, in the same way as in the case of standard rotary coil instruments, in the most homogeneous possible portion of the magnet field, which can be easily ensured by a suitable shaping of the poles of the field magnet.

If it were possible to arrange also the directing moment coil $g'$ in such a manner that its directing moment would increase proportionately to the distance from the zero position, a perfectly rectilinear scale characteristic would be obtained. By employing a special shape of the core cross section and of the pole shoes, it becomes possible to solve this problem. The flattening of the two parts must be made in such a manner that the resulting average strength of field of the magnet will decrease, with the increase of the cross section acting on the directing moment coil $g'$, in accordance with the same law as that in accordance with which the specific torque resulting from the position of the said coil relatively to the direction of the field and from the directing moment, increases with a given reduction of the angle of setting. It is not immaterial here in which form the non-homogeneousness of the magnetic field is obtained. In itself, it would be possible to obtain it by recessing or boring out the pole shoes elliptically, and by giving the core of the cross coils a circular cross section. This however has the drawback that the zero position of the rotary system will not be exactly defined, as in that position the directing moment coil would be intersected by too few lines of force. For that reason it is advisable to adopt the construction of the pole shoes and of the core of the coils, shown in Figure 4.

The arrangement according to Figure 4 shows an angle of setting which is insufficient for some purposes. For such cases it is preferable to adopt for the systems of Figs. 5 and 6 the construction shown in plan in Figure 7. In the same, there is provided a hollow core $p'$ on which the galvanometer coil $f$ is mounted in the usual manner. The directing moment coil $g'$ is shortened at one side in the direction at right angles to the axis of rotation $n$, in order to provide sufficient room for the arrangement of the core support $q'$.

The position of the coils relatively to the core is shown in detail in the perspective view Figure 8. In this case, as the possible angle of setting, is obtained the angle shown in chain dotted lines in Figure 7, which is considerably greater than the angle of setting of the instrument according to Figure 4. It is true that owing to the shortening of the directing moment coil $g'$, there will be obtained a reduction of the lines of force intersected by it, but this is not of importance for the arrangement according to the invention, as a correspondingly higher voltage can be connected or laid to this coil.

The further advantage is also obtained that the portion of the core over which the directing moment coil does not move, need not be made elliptical. Consequently this portion of the field has to be made favourable only relatively to the torque coil, and again proportional deflections will be obtained for large angles of rotation of the system. The core $p'$ is then theoretically constituted by two parts, one of which has say an elliptical, and the other part say a circular cross section. The diameter of the circle is then at the same time the major diameter of one half of the ellipse as shown in Figure 9.

What we claim as our invention and desire to be secured by Letters Patent is:—

1. An arrangement for the determination of variations of resistances comprising in combination a Wheatstone bridge including the resistance to be tested in one of the four branches, and an indicating instrument with two crossed coils disposed movably in a magnetic field, electric connections for inserting one of the two crossed coils in the diagonal branch of said bridge, and other electric means for connecting the other of the two crossed coils to the working voltage, an additional resistance of a material sensitive to temperature changes and means for introducing said additional resistance in the circuit of said last-named coil.

2. An arrangement for the determination of variations of resistances comprising in combination four branches of resistances, one of which contains the resistance to be tested, connections between said resistances to form a Wheatstone bridge, an indicating instrument including a permanent magnet and two crossed coils with a stationary core, means for disposing said two crossed coils movably in the field of said magnet, the angle of crossing lying between 40 and 60° and one of said two coils being shortened at one side in the direction at right angles to the axis of rotation and a portion of said coil being situated in the interior of said core, a source of electric current, means for connecting the Wheatstone bridge to said source, other means for connecting said shortened coil to said source and connections for inserting the other of said two coils in the diagonal branch of said bridge, a resistance of a material sensitive to temperature changes and means for introducing said last-named resistance in the circuit of said shortened coil.

3. An arrangement for the determination of variations of resistances comprising in combination four branches of resistances including the resistance to be tested, connections between said resistances to form a Wheatstone bridge, a distant indicating instrument having a stationary magnet and two crossed coils disposed movably in the field of said magnet, a source of current, connections between said source and said bridge, first leads for connecting said source to one of said two crossed coils and second leads for connecting the other of said two crossed coils to the diagonal branch of said bridge, in such a manner that the resistance of said first and said second leads is compensated with reference to the indication of said instrument by bringing the resistance of the circuit of the first-named of said two crossed coils into a predetermined relation to the bridge resistance.

4. An arrangement for the determination of variations of resistances comprising in combination four branches of resistances including the resistance to be tested, connections between said resistances to form a Wheatstone bridge, a distant indicating instrument, having a stationary magnet and two crossed coils, disposed movably under an angle of crossing between 40 and 60° in the magnetic field of said magnet, one of said two coils being shortened at one side in the direction at right angles to the axis of rotation, a source of current, connections between said source and said bridge, first leads for connecting said source to one of said two crossed coils and second leads for connecting the other of said two crossed coils to the diagonal branch of said bridge in such a manner that the resistance of said first and said second leads is compensated with reference to the indication of said instrument by bringing the resistance of the circuit of the first-named of said two crossed coils, into a predetermined relation to the bridge resistance.

5. An arrangement for the determination of variations of resistances comprising in combination four branches of equal resistances, one containing the resistances to be tested, connections between said four branches for forming a Wheatstone bridge, a distant indicating instrument having a stationary magnet and two crossed coils adapted to rotate in the magnetic field of said magnet, one of said two coils being shortened at one side in the direction at right angles to the axis of rotation, a source of current connections between said source and said bridge, first leads between said source and said shortened coil, second leads for connecting the other of said two coils in series in the diagonal branch of said bridge, the resistance in the circuit of said shortened coil substantially being made equal to the sum of the resistance amounts in the circuit of the other of said coils and of one branch of said bridge.

6. An arrangement for the determination of resistances, comprising at least one resistance to be tested sensitive to temperature, other resistances, connections between said first named and said other resistances to form a Wheatstone bridge, a distant indicating instrument including two crossed coils and a stationary permanent magnet and a stationary hollow cylindrical core for said two coils, means for disposing said two coils movably under an angle of crossing of 40 to 60° in the field of said magnet, one of said two crossed coils being shortened at one side in the direction at right angles to the axis of rotation so that a portion of this coil is situated in the interior of said core, a source of direct current, short connections between said source and said bridge, first long leads between said source and the shortened coil of said two crossed coils, second long leads between the diagonal points of said bridge and the other of said two crossed coils, the resistance in the circuit of said shortened coil being substantially equal to the sum of the resistance amounts in the circuit of the other of said two crossed coils and of one of the branches of said bridge.

7. An arrangement for the determination of variations of resistances comprising in combination four branches of resistances including the resistance to be tested, connections between said resistances to form a Wheatstone bridge, a distant indicating instrument having a stationary magnet and two crossed coils disposed movably in the field of said magnet, a source of current, connections between said source and said bridge, first leads for connecting said source to one of said two crossed coils and second leads for connecting the other of said two crossed coils to the diagonal branch of said bridge, the resistance of one of said crossed coils being equal to the resistance of the other of said crossed coils augmented by $$\frac{w_1 w_4 (w_2 + w_3) + w_2 w_3 (w_1 + w_4)}{(w_1 + w_4)(w_2 + w_3)},$$

where $w_1$ $w_2$ $w_3$ $w_4$ are the respective values of said four branches of resistances.

8. An arrangement for the determination of variations of resistances comprising in combination four branches of resistances including the resistance to be tested, connections between said resistances to form a Wheatstone bridge, a distant indicating instrument, having a stationary magnet and two crossed coils, disposed movably under an angle of crossing between 40 and 60° in the magnetic field of said magnet, one of said two coils being shortened at one side in the direction at right angles to the axis of rotation, a source of current, connections between said source and said bridge, first leads for connecting said source to one of said two crossed coils and second leads for connecting the other of said two crossed coils to the diagonal branch of said bridge, the resistance of one of said crossed coils being equal to the resistance of the other of said crossed coils augmented by $$\frac{w_1 w_4 (w_2 + w_3) + w_2 w_3 (w_1 + w_4)}{(w_1 + w_4)(w_2 + w_3)},$$

where $w_1\ w_2\ w_3\ w_4$ are the respective values of said four branches of resistances.

9. An arrangement for the determination of variations of resistances comprising in combination four branches of resistances including the resistance to be tested, connections between said resistances to form a Wheatstone bridge, a distant indicating instrument having a stationary magnet and two crossed coils disposed movably in the field of said magnet, a source of current, connections between said source and said bridge, first leads for connecting said source to one of said two crossed coils and second leads for connecting the other of said two crossed coils to the diagonal branch of said bridge, the resistance of one of said crossed coils being equal to the resistance of the other of said crossed coils augmented by $$\frac{(w_1 + w_2)(w_3 + w_4)}{w_1 + w_2 + w_3 + w_4},$$

where $w_1\ w_2\ w_3\ w_4$ are the respective values of said four branches of resistances.

10. An arrangement for the determination of variations of resistances comprising in combination four branches of resistances including the resistance to be tested, connections between said resistances to form a Wheatstone bridge, a distant indicating instrument, having a stationary magnet and two crossed coils, disposed movably under an angle of crossing between 40 and 60° in the magnetic field of said magnet, one of said two coils being shortened at one side in the direction at right angles to the axis of rotation, a source of current, connections between said source and said bridge, first leads for connecting said source to one of said two crossed coils and second leads for connecting the other of said two crossed coils to the diagonal branch of said bridge, the resistance of one of said crossed coils being equal to the resistance of the other of said crossed coils augmented by $$\frac{(w_1 + w_2)(w_3 + w_4)}{w_1 + w_2 + w_3 + w_4},$$

where $w_1\ w_2\ w_3\ w_4$ are the respective values of said four branches of resistances.

11. An arrangement for the determination of variations of resistances comprising in combination four branches of resistances including the resistance to be tested, connections between said resistances to form a Wheatstone bridge, a distant indicating instrument having a stationary magnet and two crossed coils disposed movably in the field of said magnet, a source of current, connections between said source and said bridge, first leads for connecting said source to one of said two crossed coils and second leads for connecting the other of said two crossed coils to the diagonal branch of said bridge, the individual resistance values of said four branches of resistances being equal, and the resistance of one of said crossed coils being equal to the resistance of the other of said crossed coils augmented by the resistance value of one of said branches.

12. An arrangement for the determination of variations of resistances comprising in combination four branches of resistances including the resistance to be tested, connections between said resistances to form a Wheatstone bridge, a distant indicating instrument, having a stationary magnet and two crossed coils, disposed movably under an angle of crossing between 40 and 60° in the magnetic field of said magnet, one of said two coils being shortened at one side in the direction at right angles to the axis of rotation, a source of current, connections between said source and said bridge, first leads for connecting said source to one of said two crossed coils and second leads for connecting the other of said two crossed coils to the diagonal branch of said bridge, the individual resistance values of said four branches of resistances being equal, and the resistance of one of said crossed coils being equal to the resistance of the other of said crossed coils augmented by the resistance value of one of said branches.

In testimony whereof we affix our signatures.

HEINZ GRÜSS.
KURT RAU.